United States Patent
Donolo

(10) Patent No.: US 9,660,438 B2
(45) Date of Patent: May 23, 2017

(54) SECURE AND DEPENDABLE DIFFERENTIAL PROTECTION FOR ELECTRIC POWER GENERATORS

(71) Applicant: Schweitzer Engineering Laboratories, Inc., Pullman, WA (US)

(72) Inventor: Marcos A. Donolo, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 283 days.

(21) Appl. No.: 14/554,764

(22) Filed: Nov. 26, 2014

(65) Prior Publication Data

US 2016/0149390 A1    May 26, 2016

(51) Int. Cl.
    *H02H 3/093*     (2006.01)
    *H02H 7/06*     (2006.01)

(52) U.S. Cl.
    CPC ............. *H02H 7/06* (2013.01); *H02H 3/093* (2013.01)

(58) Field of Classification Search
    CPC ................................. H02H 3/093; H02H 7/06
    See application file for complete search history.

(56) References Cited

U.S. PATENT DOCUMENTS

| | | | |
|---|---|---|---|
| 5,805,394 A * | 9/1998 | Glennon | ............... H02H 7/06 322/37 |
| 6,341,055 B1 | 1/2002 | Guzman-Casillas | |
| 6,356,421 B1 | 3/2002 | Guzman-Casillas | |
| 6,518,767 B1 | 2/2003 | Roberts | |
| 6,590,397 B2 | 7/2003 | Roberts | |
| 7,196,884 B2 | 3/2007 | Guzman-Casillas | |
| 7,319,576 B2 | 1/2008 | Thompson | |
| 7,345,863 B2 | 3/2008 | Fischer | |
| 7,375,941 B2 | 5/2008 | Schweitzer | |
| 7,425,778 B2 | 9/2008 | Labuschagne | |
| 7,660,088 B2 | 2/2010 | Mooney | |
| 7,903,381 B2 | 3/2011 | Fischer | |
| 8,154,836 B2 | 4/2012 | Kasztenny | |
| 8,289,668 B2 | 10/2012 | Kasztenny | |
| 8,405,940 B2 | 3/2013 | Schweitzer | |

(Continued)

OTHER PUBLICATIONS

Donolo, Marcos; Guzman, Armando; Mynam, Mangapathirao; Jain, Rishabh; Finney, Dale; Generator Protection Overcomes Current Transformer Limitations; Oct. 14, 2014.

(Continued)

*Primary Examiner* — Shawki S Ismail
*Assistant Examiner* — Muhammad S Islam
(74) *Attorney, Agent, or Firm* — Richard M. Edge

(57) ABSTRACT

Secure and dependable differential protection for electric power generators is described herein. An internal fault is declared if the operating current exceeds a function of the restraining current, and the operating current exceeds and adjusted pickup value. The adjusted pickup value is selected as a minimum of a compensated first pickup value and a second pickup value. The compensated first pickup value may be calculated by adding the absolute value of a compensation addend with a first pickup value. The compensation addend may be calculated by filtering, compensating, and summing current values from the neutral side and the power system side of the electrical generator. The absolute value of the compensation addend may be further adjusted using a security compensation factor.

23 Claims, 8 Drawing Sheets

(56) References Cited

U.S. PATENT DOCUMENTS

| | | | |
|---|---|---|---|
| 8,405,944 B2 | 3/2013 | Donolo | |
| 8,553,379 B2 | 10/2013 | Kasztenny | |
| 8,559,146 B2 | 10/2013 | Kasztenny | |
| 8,649,142 B2 | 2/2014 | Kasztenny | |
| 8,792,217 B2 | 7/2014 | Shah | |
| 2007/0070565 A1 | 3/2007 | Benmouyal | |
| 2009/0228224 A1* | 9/2009 | Spanier | G01R 22/10 702/60 |
| 2011/0264389 A1* | 10/2011 | Mynam | G01R 31/086 702/58 |
| 2012/0140365 A1* | 6/2012 | Labuschagne | H02H 7/26 361/47 |
| 2014/0002937 A1* | 1/2014 | Tausa | H02H 3/343 361/76 |
| 2014/0100702 A1 | 4/2014 | Schweitzer | |
| 2014/0117912 A1* | 5/2014 | Gajic | G01R 31/343 318/490 |

OTHER PUBLICATIONS

Schweitzer Engineering Laboratories, Inc., SEL-300G Multifunction Generator Relay, Instruction Manual (excerpts) Oct. 17, 2014.

Thompson, Michael J.; Percentage Restrained Differential, Percentage of What?; Sep. 14, 2010.

Altuve, Hector; Schweitzer III, Edmund; Modern Solutions for Protection, Control, and Monitoring of Electric Power Systems (sections of); Jun. 10, 2010.

* cited by examiner

SECURE AND DEPENDABLE DIFFERENTIAL PROTECTION FOR ELECTRIC POWER GENERATORS

RELATED APPLICATION (None)

TECHNICAL FIELD

This disclosure relates to protection of electric power generators. More particularly, this disclosure relates to secure and dependable differential protection for electric power generators.

BRIEF DESCRIPTION OF THE DRAWINGS

Non-limiting and non-exhaustive embodiments of the disclosure are described, including various embodiments of the disclosure with reference to the figures, in which.

Figure 1:
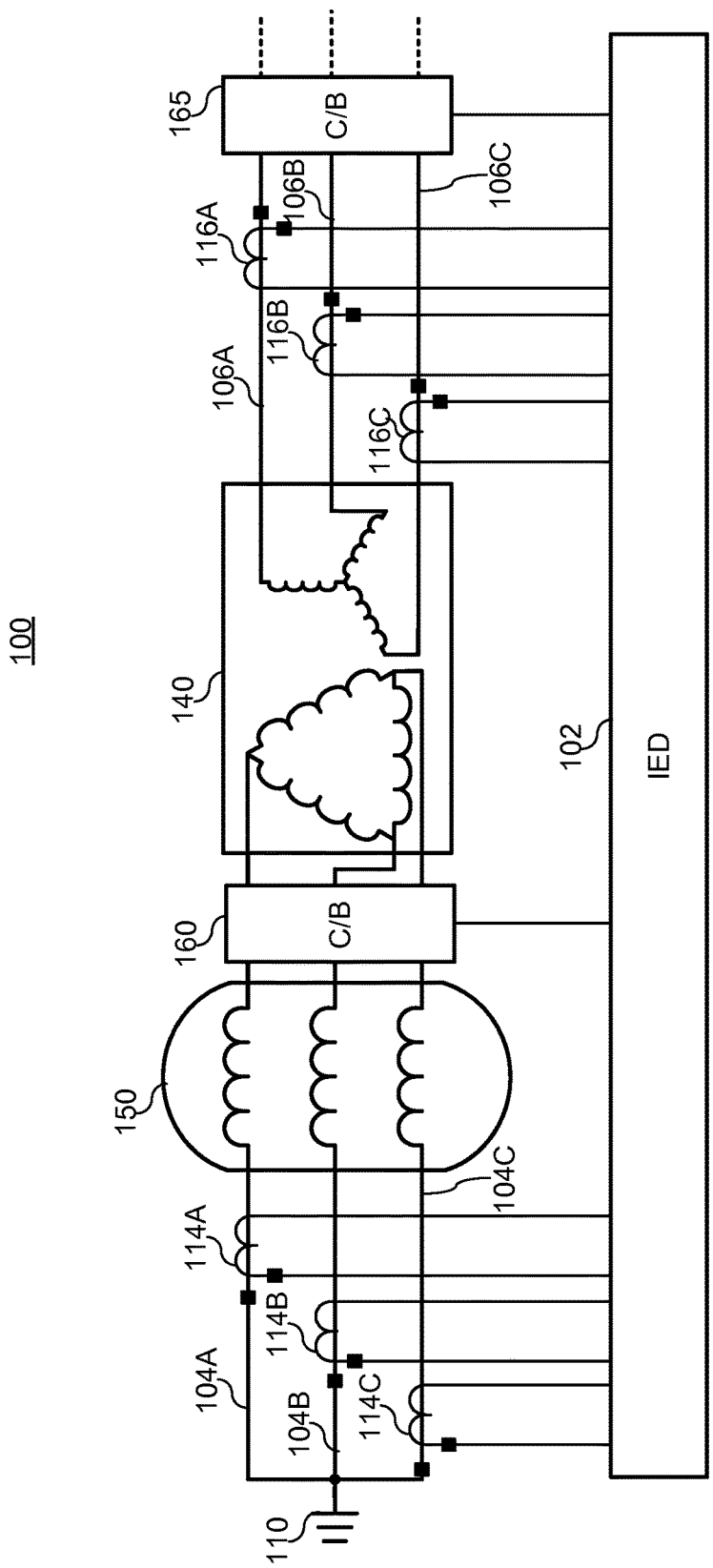
FIG. 1 illustrates a system for protection of an electrical generator.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Electric power delivery systems depend on electric generators to provide sufficient electric power for loads connected thereto. Electric power delivery systems may include generation systems, transmission systems, and/or distribution systems, and the like. Generators may be monitored and protected using several different protection elements. One such element is the differential element, used to detect faults within a protected region using current differential principles. Using current differential principles, a differential element may detect an internal fault using the sum of the current into and out of the protected region. If the differential element detects an amount of differential current that is above a predetermined threshold, the differential element may then declare a fault within the protected region. The protected region may include an electric power generator, a transformer, a bus, a transmission line, a distribution line, a circuit breaker, a recloser, or other electric power system equipment, including combinations thereof. In one specific example, the protected region may include a generator and an associated step-up transformer. In another specific example, the protected region may include a generator. In several embodiments, the protected region may be protected on a per-phase basis.

Current measurements into and out of such a protected region are often obtained using equipment such as current transformers ("CTs"), rogowski coils, or the like, which provide signals relative to the current flowing through conductors in electrical communication with the protected region. Differences in CTs (such as saturation characteristics of the CTs) may lead to uneven CT saturation during certain events, such as during transformer energization, which may result in undesired operation by the differential element. One such event, the black start procedure, requires that the generator energizes an unloaded transformer. This transformer energization generates significant unipolar inrush current that can cause uneven CT saturation and challenges the security of the differential element.

Presented herein are systems and methods for secure and dependable differential generator protection that may be used to avoid such undesired differential element operations. An external event detector may be used to detect events outside of the protected region. An internal fault may be declared if an operating current exceeds a function of the restraining current, and the operating current exceeds an adjusted pickup value, where the operating and restraining currents are calculated using the current signals on both sides of the protected region. The adjusted pickup value is selected as a minimum of a compensated first pickup value and a second pickup value. The compensated first pickup value may be calculated by adding the absolute value of a compensation addend with a first pickup value. The compensation addend may be calculated by filtering, compensating, and summing the current values from each side of the protected region. The absolute value of the compensation addend may be further adjusted using a security compensation factor.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process.

The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

FIG. 1 illustrates a system 100 for differential protection of an electrical generator. The system 100 includes an electric generator 150 that may be used to provide electric power to an electric power delivery system. The delivery system may include a generation, transmission, or distribution system, or a combination thereof. The delivery system may be a distributed generation system or the like. The generator may be any capable of generating electric power for use in an electric power delivery system, such as, for example, a steam turbine driven generator, a gas turbine driven generator, a hydroelectric generator, a diesel generator, or the like.

The generator 150 may include a neutral side with phase terminals 104A, 104B, and 104C in electrical communication with a neutral point 110 such as a ground. Each of the phase terminals 104A, 104B, and 104C may be associated with a different phase of a three-phase power system. The generator 150 may include a power system side with phase terminals 106A, 106B, and 106C in communication with a transformer 140. Each of the phase terminals 106A, 106B, and 106C may be associated with a different phase of the three-phase power system.

The generator 150 may be monitored, controlled, automated, and/or protected using an intelligent electronic device ("IED") such as IED 102. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. As used herein, an IED may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

IED 102 is in electrical communication with the generator using CTs 114A, 114B, 114C, 116A, 116B, and 116C. As illustrated CTs 114A, 114B, and 114C are each separately in electrical communication with neutral-side terminals 104A, 104B, and 104C, respectively; and CTs 116A, 116B, and 116C are each separately in electrical communication with power system side terminals 106A, 106B, and 106C, respectively. CTs 114A-C and 116A-C may include windings to provide electrical signals to IED 102 in proportion to the electrical current of the terminals with which they are in electrical communication.

Although as illustrated, transformer 140 is in delta-wye configuration, any transformer configuration is contemplated. In one embodiment, as illustrated, the transformer 140 is positioned between the generator 150 and the CTs 116A-C on the power system side terminals. In another embodiment, CTs 116A-C may be positioned between the generator 150 and the transformer 140, wherein the transformer 140 would not be part of the protected region. As illustrated, because transformer 140 is positioned between the generator 150 and the CTs 116A-C on the power system side terminals, a phase-shift may occur on each phase between respective CTs 114A-C on the neutral side of the generator and the CTs 116A-C on the power system side of the generator.

IED 102 may be configured to receive current signals from the neutral side of the generator and from the power system side of the generator using its electrical connections with CTs 114A-C and 116A-C. IED 102 may be configured as further described herein to provide differential protection to a protected region monitored by the IED 102. In particular, the protected region may include the zone between neutral-side CTs 114A-C and power system side CTs 116A-C. In an embodiment wherein power system side CTs 116A-C are positioned between the generator 150 and the transformer 140, the protected region may not include the transformer 140.

System 100 further includes a circuit breakers 160 and 165 in electrical communication with the power system side phase terminals. Circuit breaker 160 may be placed between the generator 150 and the transformer 140, and circuit breaker 165 may be placed between the transformer 140 and the remainder of the electric power delivery system. IED 102 may be in electrical communication with circuit breakers 160 and 165 to obtain status information (open/closed) therefrom. IED 102 may further be in communication with the circuit breakers 160 and 165 to send commands thereto such as a trip command circuit breaker 160, 165 to open.

The configuration illustrated in FIG. 1 may be useful for detecting faults within the protected region, including the generator 150 during black start conditions. A black start may refer to a condition where the generator is used to energize the transformer 140 without any power being supplied by the electric power delivery system to the transformer 140. During such operations, circuit breaker 160 may initially be open (circuit breaker 165 may be open or closed). Generator 150 may then be started and brought up to nominal voltage and frequency. Once the generator 150 reaches nominal voltage and frequency, circuit breaker 160 may be closed, allowing for the energization of transformer 140. Without power being supplied to transformer 140 from the electric power delivery system, an inrush condition may occur when closing circuit breaker 160 to energize transformer 140. Inrush conditions may result in saturation of CTs 114A-C and/or 116A-C used to obtain current signals from the system 100 for IED 102. Such saturation of CTs may lead to an internal fault signal where there is no internal fault.

In certain embodiments, IED 102 may be configured to send a trip command to circuit breakers 160 and/or 165 upon detection of an internal fault. Circuit breakers 160 and 165 include mechanisms and circuitry necessary to open one or more phases of the power system side phase conductors upon receipt of the trip command, electrically isolating such phase terminals from a remainder of the electric power delivery system.

IED 102 may be configured to provide differential protection to the protected region by detecting internal faults using a differential element. Differential protection may include comparing an operating current ("$I_{OP}$") with a restraining current ("$I_{RT}$"). In one embodiment as described herein, differential protection may be performed on a per-phase basis. IED 102 may calculate $I_{OP}$ and $I_{RT}$ using the current signals received from the neutral-side terminals and from the power system side terminals. The $I_{OP}$ may be the absolute value of the sum of currents of a particular phase entering and leaving the protected region, and may be calculated using Equation 1, which illustrates the calculation of $I_{OP}$ for phase A:

$$I_{OP\_A} = |I_{A1} + I_{A2}| \qquad \text{Eq. 1}$$

where:

$I_{A1}$ is the current signal on the "A" phase on the neutral-side phase terminals; and $I_{A2}$ is the current signal on the "A" phase on the power system side phase terminals.

The $I_{RT}$ may be a scaled sum of the absolute values of the currents of a particular phase entering and leaving the protected region, and may be calculated using Equation 2:

$$I_{RT\_A} = k*(|I_{A1}| + |I_{A2}|) \qquad \text{Eq. 2}$$

where:

$I_{A1}$ is the current signal on the "A" phase on the neutral-side phase terminals;

$I_{A2}$ is the current signal on the "A" phase on the power system side phase terminals; and, k is a scaling factor.

As has been noted above, in several embodiments detailed herein, differential protection may occur on a per-phase basis. Thus, similar calculations as those represented by Equations 1 and 2 may be performed to calculate the $I_{OP}$ and $I_{RT}$ for other phases on the power system, such as on phases B and C as illustrated in FIG. 1. In some embodiments, the scaling factor may be unity. In other embodiments, the scaling factor may be from around 0.5 to around 1.

The IED 102 may be configured to detect an internal fault condition when both $I_{OP}$ is greater than the function of $I_{RT}$ and $I_{OP}$ is greater than a first pickup value. The IED 102 may be further configured to use a second pickup value and an increased function of $I_{RT}$ under a high-security condition such as, for example, a detected external event. When $I_{OP}$ exceeds both the pickup value and the function of $I_{RT}$, the IED 102 may signal detection of an internal fault, and may further issue a trip command to the circuit breaker 160 to open and separate the generator 150 from the electric power delivery system. The IED 102 may be configured to issue further commands or communications to, for example, isolate the generator 150 and notify the appropriate personnel or systems. For example, commands or communications from IED 102 may be used to open circuit breakers, close valves such that a prime mover of the generator is isolated from rotational forces from, for example, a steam plant, hydroelectric dam, or the like, and/or notify personnel using, for example, network communications, a human-machine interface, or the like.

Figure 2:
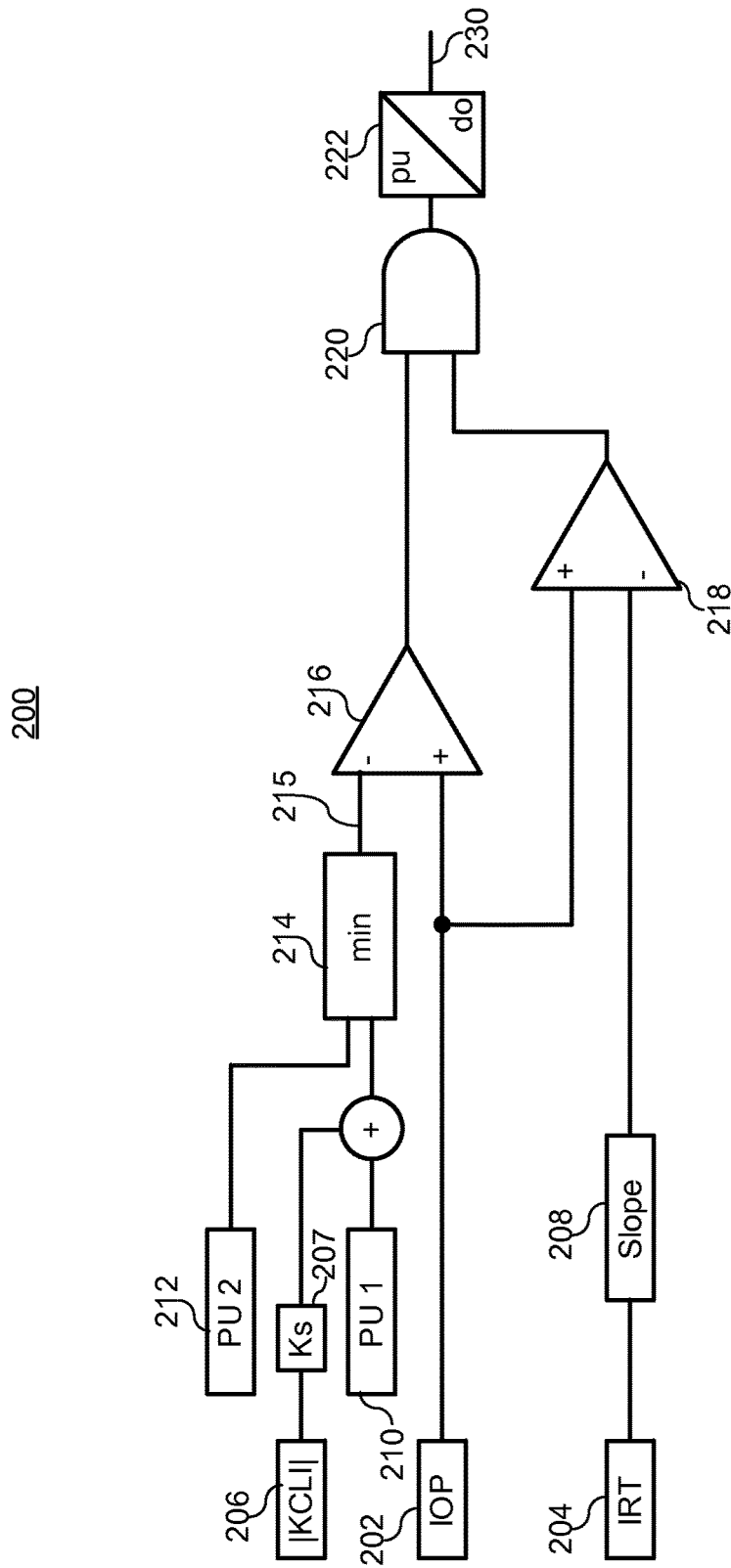
FIG. 2 illustrates a block diagram of differential protection of an electrical generator.

FIG. 2 illustrates a block diagram of a differential protection element 200 that may be used by IED 102 of FIG. 1 to detect internal faults on the electric generator 150. The differential protection element 200 uses $I_{OP}$ 202 and $I_{RT}$ 204 such as may be calculated using Equations 1 and 2. A function of the $I_{RT}$ 204 may be compared against the $I_{OP}$ 202 in comparator 218. In the illustrated embodiment, the function is a slope function 208, wherein the $I_{RT}$ value 204 may be multiplied by a slope value 208. The slope value 208 may be selected among a number of slope values based on whether an external event has been detected by the IED 102. In one embodiment, the IED may include a sensitive slope value and a high-security slope value to be used upon detection of an external event. The product of the $I_{RT}$ 204 and the slope 208 are compared against $I_{OP}$ 202 in comparator 218. If the product of the $I_{RT}$ 204 and the slope 208 is less than $I_{OP}$ 202, then comparator 218 signals AND gate 220.

$I_{OP}$ 202 is compared against an adjusted pickup value 215 in comparator 216. The adjusted pickup value 215 may be calculated using a first pickup value 210, a second pickup value 212, and an absolute value of a compensation addend 206. The compensation addend 206 may be calculated as described in FIG. 3. To calculate the adjusted pickup value 215, the absolute value of the compensation addend 206 may be scaled using a security scaling factor Ks 207 and added to the first pickup value to form a scaled compensation addend. The scaled compensation addend is summed with the first pickup value 210. The minimum 214 of the sum and the second pickup value becomes the adjusted pickup value 215.

The adjusted pickup value 215 may be compared with the $I_{OP}$ 202 in comparator 216. If $I_{OP}$ 202 is greater than the adjusted pickup value 215, then comparator 216 signals AND gate 220. AND gate 220 may signal timer 222 if both comparators 216 and 218 signal AND gate 220 indicating that $I_{OP}$ 202 is greater than the product of $I_{RT}$ 204 and slope 208, and $I_{OP}$ 202 is greater than the adjusted pickup value 215. Timer 222 may be a pickup/dropout timer which indicates presence of an internal fault 230 when AND gate 220 signals the timer 222 for sufficient time. The internal fault signal 230 may be used by the IED as further contemplated herein to declare a fault, open a circuit breaker, send a communication, or the like.

Pickup values 210 and 212 may be preselected. In some embodiments, the pickup values 210 and 212 may be selected as multiples of a per-unit compensation value. The per-unit compensation value may be selected to compensate for signals received from CTs 114A-C and 116A-C. The compensation value may be calculated to compensate for differences between CTs 114A-C on the neutral side and CTs 116A-C on the power system side of the generator; as well as for differences introduced by the step-up transformer 140. In one embodiment, the per-unit compensation value may be a value of TAP. As discussed above, TAP may be calculated to convert all secondary currents from the CTs 114A-C and 116A-C entering the IED 102 to per-unit values by compensating for differences between the CTs as well as for differences introduced by the step-up transformer. Differences introduced by the step-up transformer may include, for example, angle differences introduced by the winding configuration (e.g. delta-wye), and magnitude differences introduced by the number of windings. In one embodiment, the first pickup value 210 may be around 0.3. In one embodiment, the second pickup value may be around 1.25.

Figure 3:
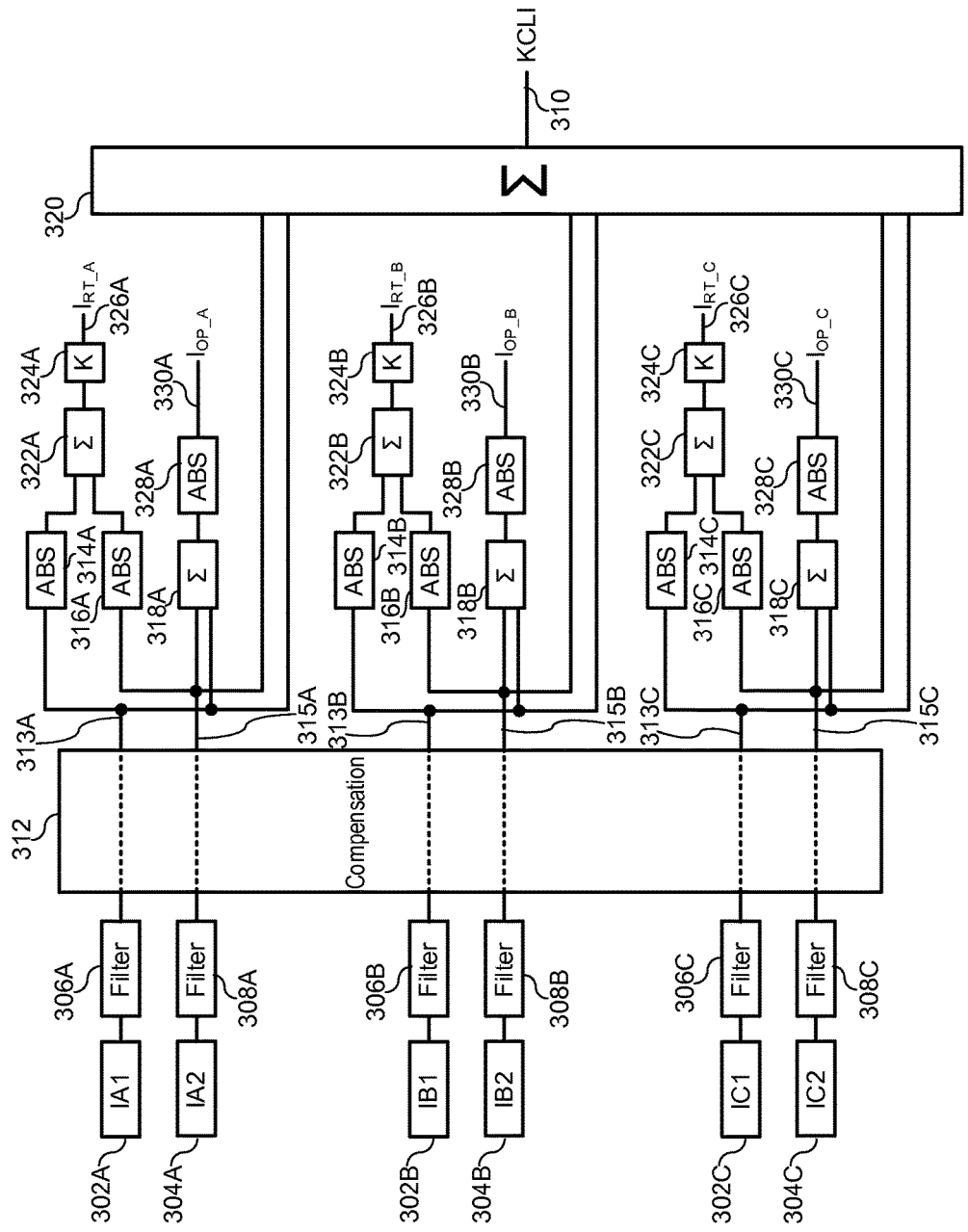
FIG. 3 illustrates a block diagram for calculation of a compensation addend for differential protection of an electrical generator.

FIG. 3 illustrates a block diagram that may be used by the IED 102 of FIG. 1 to calculate the compensation addend, which may be referred to herein as KCLI. As discussed herein, differential protection may be performed on a per-phase basis. Thus, restraining currents, and operating currents, may be calculated on a per-phase basis, as illustrated in FIG. 3. CTs 114A-C and CTs 116A-C may be configured to provide current signals corresponding with the current of the electric power conductors associated with the respective CTs. Neutral side current signals for each phase 302A-C and power system side current signals for each phase 304A-C may each be filtered using respective filters 306A-C and 308A-C. In one embodiment the filters used are cosine filters. In another embodiment, no filters may be used, where the system is configured to use raw data.

In embodiments where there is a transformer between CTs 114A-C and CTs 116A-C, the current magnitudes and angles on the conductors associated with CTs 114A-C may be different from those associated with CTs 116A-C. To properly sum the current signals from all CTs 114A-C and 116A-C, certain compensation may be made to adjust for the differences in current magnitude and angle introduced by the CTs and/or transformer. Thus, currents IA1 302A, IB1 302B, and IC1 302C from CTs 114A-C and currents IA2 304A, IB2 304B and IC2 304C from CTs 116A-C may undergo compensation in block 312 for each phase on the neutral side and on the power system side of the generator. Such compensation may be performed, for example, for differences in the number of windings between CT pairs on the neutral side and on the power-system side of the generator, for example between CTs 114A-C and CTs 116A-C. Such compensation may be performed, for example, for differences introduced by the transformer 140. Differences that may be introduced by the transformer include, for example, current phase angle and/or current magnitude on each phase. The filtering and compensation yields filtered and compensated currents 313A-C for each phase of the three phase system on the neutral side of the generator, and filtered and compensated currents 315A-C for each phase of the three phase system on the power system side of the generator.

With the currents 313A-C and 315A-C, $I_{OP}$, $I_{RT}$, for each phase, and KCLI may be calculated. To calculate $I_{RT}$ on each phase, the absolute values of the neutral side currents for each phase may be calculated in blocks 314A-C respectively, and the absolute values of the power system side currents for each phase may be calculated in blocks 316A-C respectively. For each phase, the absolute values may be summed 322A-C, and scaled with a scaling factor K 324A-C to produce restraining currents $I_{RT}$ for each phase 326A-C.

To calculate $I_{OP}$ on each phase, the currents from the neutral side and the currents from the power system side for each phase may be summed in blocks 318A-C. The absolute values of the sums for each phase may then be calculated in blocks 328A-C to produce the operating currents $I_{OP}$ for each phase 330A-C.

To calculate the compensation addend KCLI 310, the filtered, compensated currents from the neutral side 313A-C and the filtered, compensated currents from the power system side 315A-C of all phases may be summed in block 320 to produce KCLI 310. As discussed above, the absolute value of KCLI may be used for the compensation addend 206 of FIG. 2, where the absolute value KCLI may be scaled by a security scaling factor Ks for calculation of the adjusted pickup value.

Under normal operating conditions, KCLI 310 would have a value of around zero. Similarly, under internal and external fault conditions, KCLI 310 would have a value of around zero. However, during conditions where one or more CTs become saturated, the absolute value of KCLI 310 will increase. Thus, using the absolute value of the compensation addend 206 to increase the first pickup value 210, security of the differential element is increased. To further increase security, the absolute value of the compensation addend 206 of FIG. 2 may be scaled using a security scaling factor Ks 207. The security scaling factor Ks 207 may be a setting for the IED 102. The security scaling factor Ks 207 may be set to around 1.1.

Figure 4:
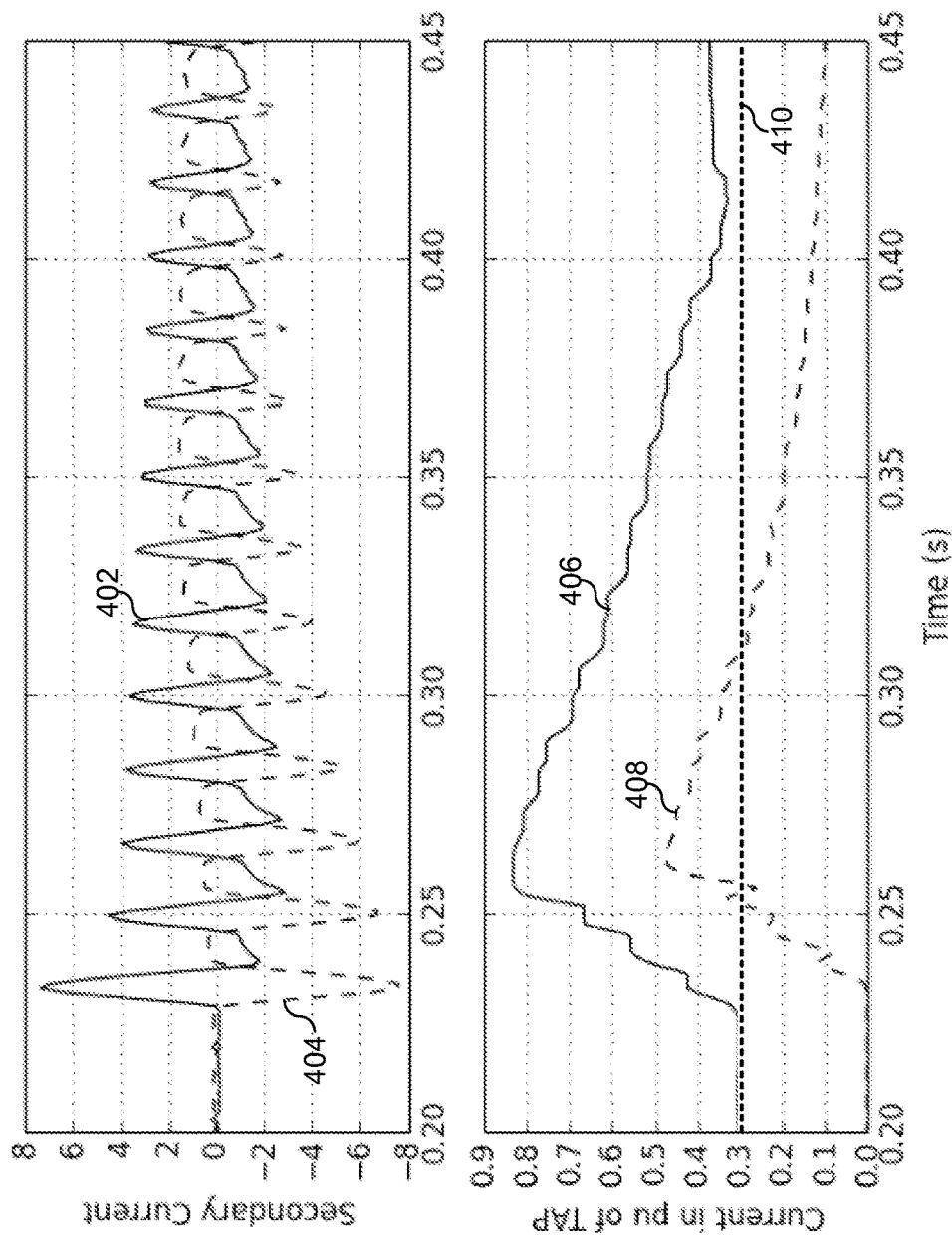
FIG. 4 illustrates plots of current values and differential protection during transformer energization.

FIG. 4 illustrates plots of current values and differential protection values during transformer energization. Both plots are on a common time scale. The B-phase secondary current from a neutral side of the generator (such as, for example, IB1 302B from CT 114B) is shown at 402, where the B-phase secondary current from the power system side of the generator (such as, for example, IB2 304B from CT 116B) is shown at 404. The currents 402 and 404 are shown as amps secondary. The first pickup value 410, operating current $I_{OP}$ 408 and adjusted pickup value 406 are shown in per-unit of TAP basis. The first pickup value 410 has been set to 0.3.

As discussed above, transformer energization may take place once the generator has been brought up to nominal frequency and voltage with circuit breaker 160 open. Circuit breaker 160 may have been closed at around time 0.23, where it can be seen that the adjusted pickup value 406 increases due to inrush current to the transformer, and CT saturation. It can also be seen that the operating current $I_{OP}$ 408 exceeds the first pickup value 410 for a 50 ms period, but never exceeds the adjusted pickup value 406. Thus, the IED 102 using the differential element described herein would not have declared an internal fault, even under CT saturation during energization of the transformer.

Figure 5:
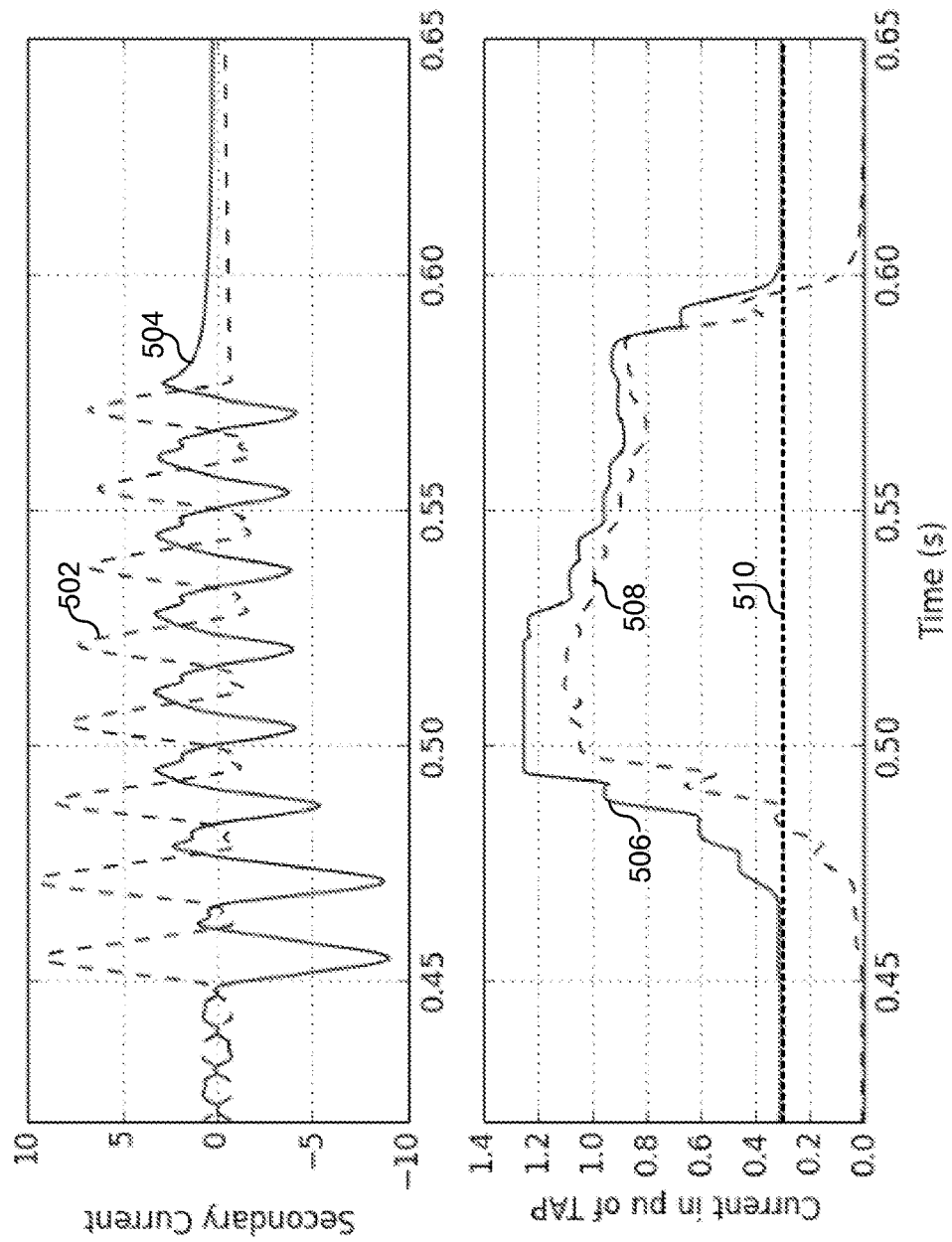
FIG. 5 illustrates plots of current values and differential protection during another transformer energization.

FIG. 5 illustrates plots of current values and differential protection values during a different transformer energization. Again, both plots are on a common time scale. In this example, the C-phase secondary current from a neutral side of the generator (such as, for example IC1 302C from CT 114C) is shown at 504, where the C-phase secondary current from the power system side of the generator (such as, for example, IC2 304C from CT 116C) is shown at 502. The currents 502 and 504 are shown as amps secondary. The first pickup value 510, operating current $I_{OP}$ 508 and adjusted pickup value 506 are shown in per-unit of TAP basis. The first pickup value 510 has been set to 0.3, and the second pickup value (e.g. 212 of FIG. 2) is set to 1.25.

In the embodiment illustrated in FIG. 5, the operating current $I_{OP}$ 508 exceeds the first pickup value 510, and approaches the adjusted pickup value 506. At around time 0.49, the sum of the first pickup value 210 with the product of the compensation addend 206 and security scaling factor Ks 207 exceeds the second pickup value 212 of 1.25. Thus, at around time 0.49, the adjusted pickup value 506 becomes the second pickup value 212 for a time. Although the operating current $I_{OP}$ 508 exceeds 1.0, the differential element is not asserted during the transformer energization illustrated in FIG. 5 because the operating current $I_{OP}$ 508 does not exceed the adjusted pickup value 506. Thus, an IED 102 using the differential element described herein would not have declared an internal fault, even under CT saturation conditions accompanying energization of the transformer as illustrated in FIG. 5.

Figure 6:
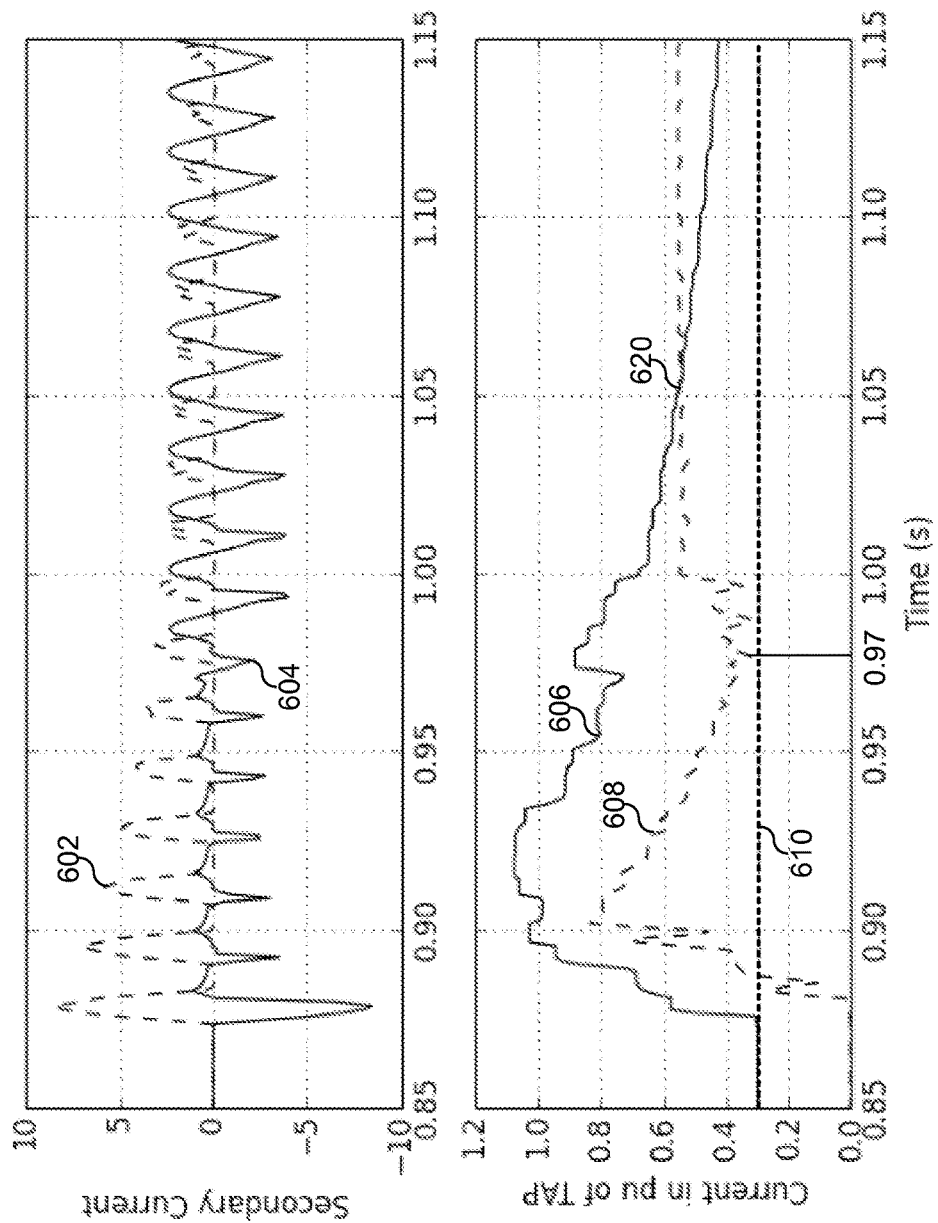
FIG. 6 illustrates plots of current values and differential protection during another transformer energization and fault.

FIG. 6 illustrates plots of current values and differential protection values during yet another transformer energization event. The event illustrated in FIG. 6 is an external fault evolving into an internal phase-to-phase fault. Again, both plots are on a common time scale. In this example, the B-phase secondary current from a neutral side of the generator (such as, for example IB1 302B from CT 114B) is shown at 604, where the B-phase secondary current from the power system side of the generator (such as, for example, IB2 304B from CT 116B) is shown at 602. The currents 602 and 604 are shown as amps secondary. The first pickup value 610, operating current $I_{OP}$ 608 and adjusted pickup value 606 are shown in per-unit of TAP basis. The first pickup value 610 has been set to 0.3, and the second pickup value (e.g. 212 of FIG. 2) is set to 1.25.

The operating current $I_{OP}$ 608 exceeds the first pickup value 610 just before time 0.90. In the embodiment illustrated in FIG. 6, at around six cycles into the energization of the transformer (around time 0.97), a low-current internal fault develops. Although the adjusted pickup value 606 increases according to the embodiments described herein, at just after time 1.05 the operating current $I_{OP}$ 608 exceeds the adjusted pickup value 606. Thus, at point 620 an IED using the differential element described herein would declare an internal fault, and may proceed to take action to isolate the generator from the remainder of the electric power delivery system by, for example, opening circuit breakers 160 and/or 165 of FIG. 1. Thus, although the differential element described herein and used in FIG. 6 increases security, the internal fault is still detected using the differential element described herein.

Figure 7:
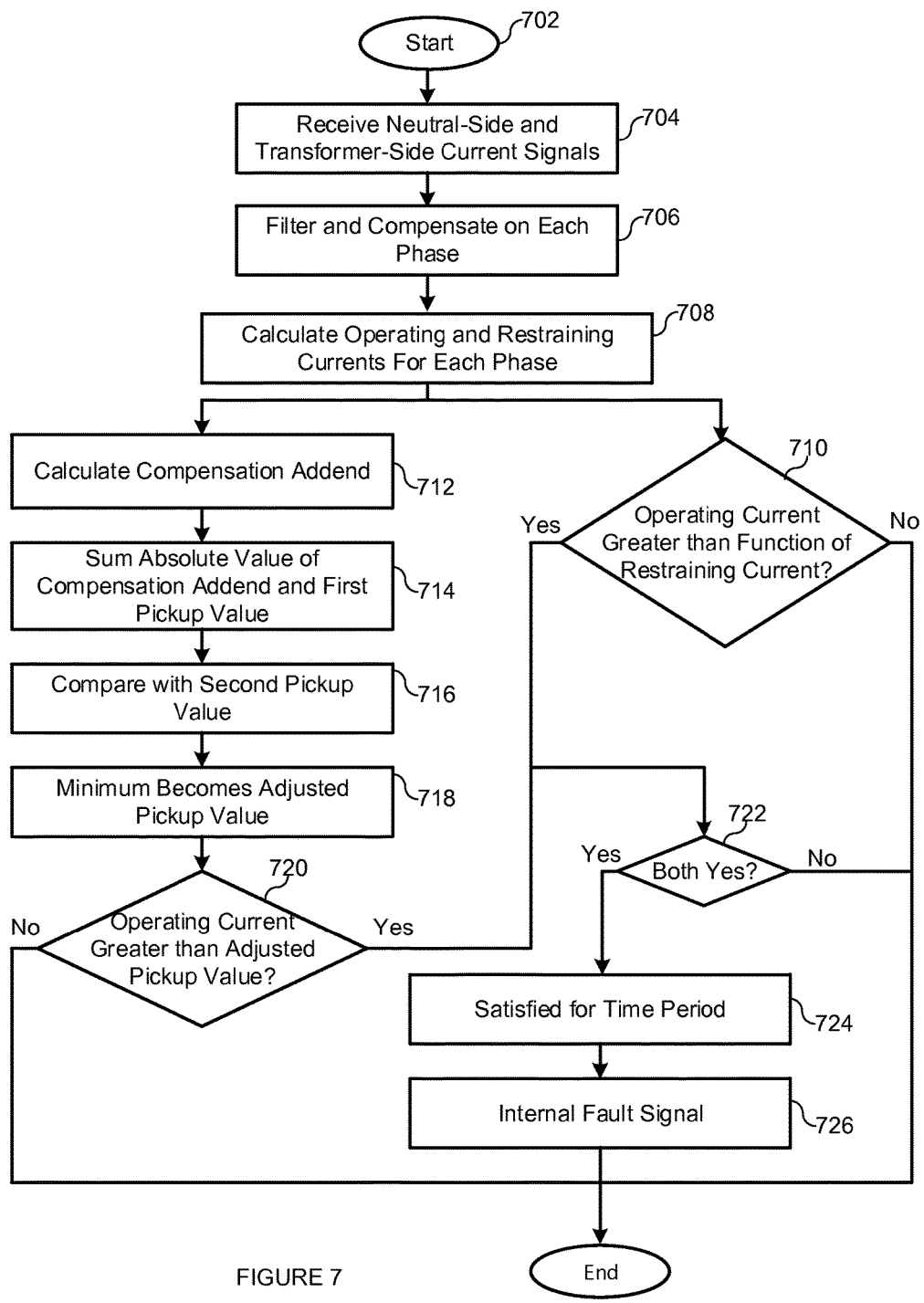
FIG. 7 illustrates a method for providing differential protection to an electrical generator.

FIG. 7 illustrates a method for providing differential protection to an electrical generator. The method starts 702 with receiving the neutral-side and power system side current signals 704 from, for example, CTs 114A-C and 116A-C. In some embodiments, current signals may be received from intervening devices. The current signals may be analog, digital, or digitized analog signals. As illustrated in conjunction with FIG. 3, each of the current signals may be filtered and compensated 706. Operating and restraining currents $I_{OP}$ and $I_{RT}$ may then be calculated 708 for each phase using the current signals from the neutral-side and power system side of the generator.

The method determines whether the operating current $I_{OP}$ is greater than a function of the restraining current $I_{RT}$ 710. If the operating current $I_{OP}$ is not greater than the function of the restraining current $I_{RT}$, then the process ends. If, however, the operating current $I_{OP}$ is greater than the function of the restraining current $I_{RT}$, then the method may continue to 722, discussed below.

The method calculates a compensation addend 712 as discussed above and in particular in conjunction with FIG. 3. The absolute value of the compensation addend and a first pickup value may be summed 714. In some embodiments, the absolute value of the compensation addend may be scaled with a security scaling factor Ks before being summed with the first pickup value. The sum may then be compared with a second pickup value 716. The minimum becomes the adjusted pickup value 718. The method then determines whether the operating current $I_{OP}$ is greater than the adjusted pickup value 720. If the operating current $I_{OP}$ is not greater than the adjusted pickup value, then the method ends. If, however, the operating current $I_{OP}$ is greater than the adjusted pickup value 720, then the method determines whether both 710 and 720 are yes 722. If not, then the method ends. However, if so, then the method determines whether both conditions are satisfied for a predetermined time period 724. The predetermined time period may be a period of time or a number of cycles. If the conditions are satisfied for the time period 724, then the method issues an internal fault signal 726. As discussed above, once an internal fault is declared, the IED 102 may issue a trip command to a circuit breaker and/or issue a communication to other equipment or personnel.

Figure 8:
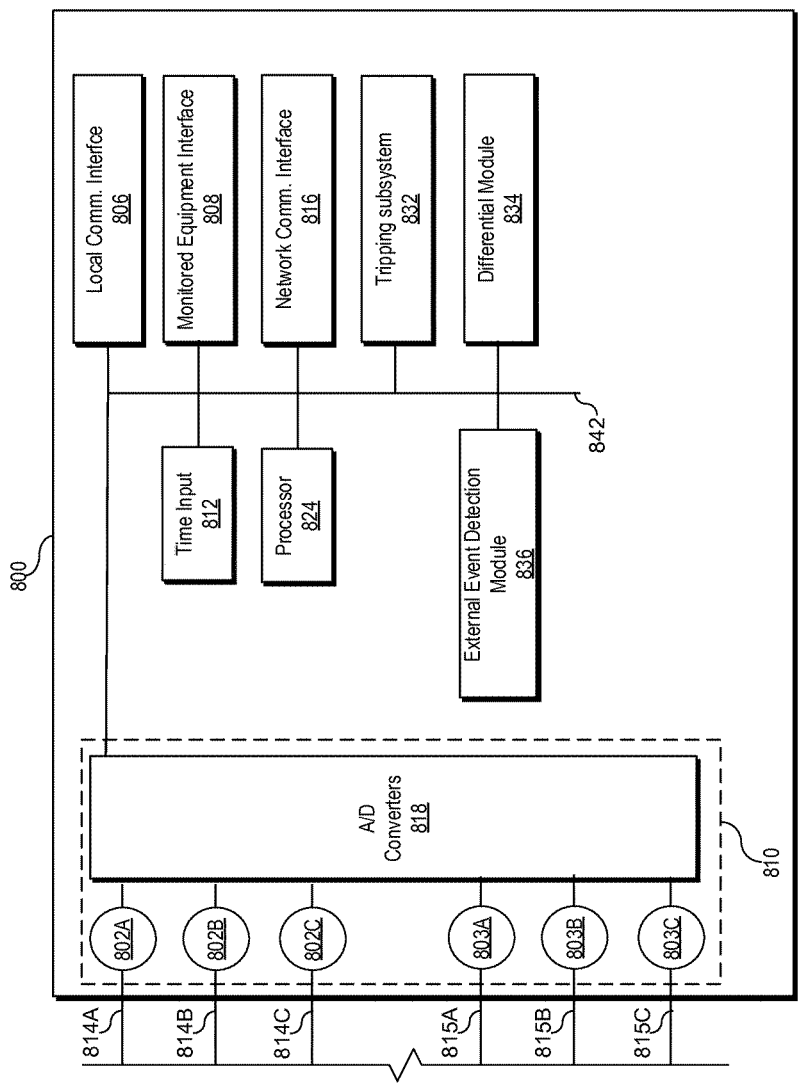
FIG. 8 illustrates a functional block diagram of an intelligent electronic device in electrical communication with an electrical generator for providing differential protection thereto.

FIG. 8 illustrates a function block diagram of a generator protection element 800 configured to monitor generator current signals and to detect an internal fault consistent with embodiments of the present disclosure. Generator protection element 800 may be configured to perform a variety of tasks using a configurable combination of hardware, software, firmware, and/or any combination thereof. FIG. 8 illustrates an embodiment that includes hardware and software, various embodiments of the present disclosure may be implemented in an embedded system, field programmable gate array implementations, and specifically designed integrated circuit. In some embodiments, functions described in connection with various modules may be implemented in various types of hardware. Moreover, certain components or functions described herein may be associated with other devices or performed by other devices. The specifically illustrated configuration is merely representative of one embodiment consistent with the present disclosure.

Generator protection element 800 includes a network communications interface 816 configured to communicate with other IEDs and/or system devices. In certain embodiments, the network communications interface 816 may facilitate direct communication with another IED or communicate with another IED over a communications network. The network communications interface 816 may facilitate communications with multiple IEDs. Generator protection element 800 may further include a time input 812, which may be used to receive a time signal allowing generator protection element 800 to apply a time-stamp to the acquired samples. In certain embodiments, a common time reference may be received via communications interface 816, and accordingly, a separate time input may not be required for time-stamping and/or synchronization operations. One such embodiment may employ the IEEE 1588 protocol. A monitored equipment interface 808 may be configured to receive status information from, and issue control instructions to, a piece of monitored equipment such as, for example, a generator, transformer, and/or circuit breakers as illustrated in FIG. 1. In some embodiments, the monitored equipment may be a generator, and generator protection element 800 may be configured to control the operation of the generator.

A local communication interface 806 may also be provided for local communication with generator protection element 800. The local communication interface 806 may be embodied in a variety of ways, including as a serial port, a parallel port, a Universal Serial Bus (USB) port, an IEEE 1394 Port, and the like.

In certain embodiments, generator protection element 800 may include a sensor component 810. In the illustrated embodiment, sensor component 810 is configured to gather data from a plurality of conductors 814A-C and 815A-C and may use, for example, analog-to-digital ("A/D") converters 818 that may sample and/or digitize filtered waveforms to form corresponding digitized current and voltage signals provided to data bus 842. Conductors 814A-C and 815A-C may be electrically connected to an output of a generator. In some embodiments, conductors 814A-C and 815A-C may be in electrical communication with the secondary windings of CTs 114A-C and 115A-C of FIG. 1. In some embodiments transformers (802A, 802B, 802C, 803A, 803B, 803C) may reduce the voltage or current to a level appropriate for monitoring the generator using protection element 800. A/D converters 818 may include a single A/D converter or separate A/D converters for each incoming signal. A current signal may include separate current signals from each phase of a three-phase electric power system. A/D converters 818 may be connected to processor 824 by way of data bus 842, through which representations of electrical parameters determined by sensor elements 802A-C and 803A-C may be transmitted to processor 824. In various embodiments, the representations of electrical parameters may represent parameters, such as currents, voltages, frequencies, phases, and other parameters associated with an electric power distribution system. Sensor elements 802A-C and 803A-C may represent a variety of types of elements, such as voltage transformers, current transformers, status inputs, a breaker controller, etc. Thus, current signals from each of the phases on the neutral side and the power system side of the generator may be obtained by the protection element 800.

Processor 824 may be configured to process communications received via communications interface 816, time input 812, monitored equipment interface 808, local communications interface 806, and/or sensor component 810. Processor 824 may operate using any number of processing rates and architectures. Processor 824 may be configured to perform various algorithms and calculations described herein. Processor 824 may be embodied as a general purpose integrated circuit, an application specific integrated circuit, a field-programmable gate array, and/or any other suitable programmable logic device.

A time subsystem 830 may be configured to determine a length of time during which a characteristic is satisfied. In various embodiments, the time subsystem 830 may receive time information from time input 812 and use such information to determine the length of time during which the real power output and the imaginary power output satisfies the tripping characteristic. In some embodiments, the time system may include an internal time keeping system (not shown) that may be used to determine whether the tripping characteristic is satisfied for a specified time delay. In some embodiments, the threshold time delay may be determined with reference to the number of cycles of the electric power generation and distribution system.

A tripping subsystem 832 may be configured to issue a trip command based upon satisfaction of the tripping characteristic and satisfaction of the length of time. In various embodiments, the tripping subsystem 832 may be in communication with a breaker, recloser, or other device that may be configured to interrupt an electrical connection between the generator and an electric power delivery system.

In some embodiments, generator protection element 800 may be configured to require detection of an internal fault condition using a differential module 834 prior to issuing a trip command. The differential module 834 may be configured in various embodiments to declare an internal fault condition based on operating currents $I_{OP}$ and restraining currents $I_{RT}$ calculated from the current signals provided by the sensor component 810, as well as pickup thresholds that may be entered using, for example, the local communication interface 806 at setting time. More specifically, the differential module 834 may be configured to detect an internal fault using the methods described herein by comparing the operating and restraining currents, and comparing the operating current against an adjusted pickup threshold value.

The generator protection element 800 may also include an external event detection module 836. The external event detection module 836 may be configured to detect fault conditions outside of the protected region. In one embodiment, the external event detection module 836 may detect external events by detecting change in the incremental restraining current while no change is detected in the incremental operating current for a predetermined time. In another embodiment, the external event detection module 836 may detect external events by detecting harmonic distortion from the CTs using the current signals therefrom. For example, if harmonic distortion (such as second-harmonic content) in a particular phase exceeds a predefined threshold and exceeds a predetermined fraction of the fundamental current, then an external event may be declared. The external event detection module may be configured to signal the differential module 834 upon detection of an external event. Upon receipt of the signal indicating an external event, the differential module 834 may be configured to enter high-security mode, wherein high-security pickup thresholds may be used.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for providing electrical power, comprising:
    an electric power generator with neutral-side terminals and power system side terminals, where the power system side terminals are in electrical communication with an electric power delivery system and the neutral-side terminals are in electrical communication with neutral;
    an intelligent electronic device ("IED") comprising:
        a first set of conductors for communicating signals from the neutral-side terminals;
        a second set of conductors for communicating signals from the power system side terminals;
        an analog-to-digital converter in communication with the first and second sets of conductors for producing current signals therefrom;
        a differential element module in communication with the analog-to-digital converter, configured to issue an internal fault signal when
            the operating current exceeds a function of a restraining current value and
            the operating current exceeds the minimum of
                a first pickup value and a sum of
                    a second pickup value and
                    a scaled compensation addend comprising a sum of the current signals;
        a tripping module in communication with the differential element, configured to issue a tripping signal upon receipt of the internal fault signal; and,
    a circuit breaker in communication with the IED, configured to open upon receipt of the tripping signal from the IED.

2. A system for providing electrical power, comprising:
    an electric power generator with neutral-side terminals and power system side terminals, where the power system side terminals are in electrical communication with an electric power delivery system and the neutral-side terminals are in electrical communication with neutral;
    an intelligent electronic device ("IED") comprising:
        a first set of conductors for communicating signals from the neutral-side terminals;

a second set of conductors for communicating signals from the power system side terminals;

an analog-to-digital converter in communication with the first and second sets of conductors for producing current signals therefrom;

a differential element module in communication with the analog-to-digital converter, configured to issue an internal fault signal when an operating current from the current signals exceeds a function of a restraining current value from the current signals, and the operating current exceeds an adjusted pickup value;

a tripping module in communication with the differential element, configured to issue a tripping signal upon receipt of the internal fault signal; and, a circuit breaker in communication with the IED, configured to open upon receipt of the tripping signal from the IED.

3. The system of claim 2, wherein the differential element is further configured to calculate the function of the restraining current by scaling the restraining current with a high-security characteristic slope value.

4. The system of claim 2, wherein the differential element is further configured to calculate an adjusted pickup value addend using the current signal values, and calculate the adjusted pickup value by summing an absolute value of the adjusted pickup value addend and a first pickup value.

5. The system of claim 4, wherein the differential element is further configured to calculate the addend by compensating the current signals, and summing the compensated current signals.

6. The system of claim 5, wherein the differential element is configured to compensate the current signals for differences between current transformers on the neutral-side terminals in communication with the first set of conductors, and current transformers on the power system side terminals in communication with the second set of conductors.

7. The system of claim 5, wherein the differential element is configured to compensate the current signals for differences introduced by a step-up transformer between current transformers on the neutral-side terminals in communication with the first set of conductors, and current transformers on the power system side terminals in communication with the second set of conductors.

8. The system of claim 5, further comprising filtering the current signals, wherein the filtering comprises cosine filtering.

9. The system of claim 4, wherein the differential element is further configured to multiply the absolute value by a security scaling factor to calculate the adjusted pickup value addend.

10. The system of claim 2, wherein the differential element is further configured to calculate an adjusted pickup value addend using the current signal values, and calculate the adjusted pickup value by summing an absolute value of the adjusted pickup value addend and a first pickup value, and select the minimum of the sum and a second pickup value as the adjusted pickup value.

11. The system of claim 10, wherein the second pickup value comprises 1.25.

12. An intelligent electronic device ("IED") for providing differential protection to an electric power generator, comprising:

an analog-to-digital converter in electrical communication with conductors for communicating signals from a neutral side of an electrical generator and with conductors for communicating signals from a power system side of an electrical generator, configured to form current signals from the conductors;

a differential element module in communication with the analog-to-digital converter, configured to issue an internal fault signal when an operating current value from the current signals exceeds a function of a restraining current value from the current signals, and the operating current value exceeds an adjusted pickup value;

a tripping module in communication with the differential element, configured to issue a tripping signal upon receipt of the internal fault signal; and, a monitored equipment interface in communication with a circuit breaker, configured to signal the circuit breaker to open upon receipt of the tripping signal.

13. The system of claim 12, wherein the differential element is further configured to calculate an adjusted pickup value addend using the current signal values, and calculate the adjusted pickup value by summing an absolute value of the adjusted pickup value addend and a first pickup value.

14. The system of claim 13, wherein the differential element is further configured to calculate the addend by filtering the current signals, compensating the current signals, and summing the filtered compensated current signals.

15. The system of claim 14, wherein the differential element is configured to compensate the current signals for differences between current transformers on the neutral side and current transformers on the power system side of the generator.

16. The system of claim 14, wherein the differential element is configured to compensate the current signals for differences introduced by a step-up transformer to currents on the neutral side and on the power-system side of the generator.

17. The system of claim 12, wherein the differential element is further configured to calculate an adjusted pickup value addend using the current signal values, and calculate the adjusted pickup value by summing an absolute value of the adjusted pickup value addend and a first pickup value, and select the minimum of the sum and the second pickup value as the adjusted pickup value.

18. A method for electric power generator differential protection, comprising the steps of:

an intelligent electronic device ("IED") in electrical communication with an electrical generator obtaining neutral-side and power system side current signals from the electrical generator;

the IED filtering the current signals;

the IED compensating the filtered current signals for differences in current transformers in communication with the neutral-side of the generator and the power system side of the generator;

the IED calculating an operating current from the current signals;

the IED calculating a restraining current from the current signals;

the IED summing the compensated current signals, and adding the compensated current signals to a first pickup value to form an adjusted pickup value;

the IED comparing the operating current to a function of a restraining current;

the IED comparing the operating current to the adjusted pickup value;

the IED declaring an internal fault when the operating current exceeds the function of the restraining current and the operating current exceeds the adjusted pickup value; and, opening a circuit breaker in response to the detected internal fault.

19. The method of claim 18, further comprising comparing the sum of the compensated current signals and the first pickup value with a second pickup value;
   wherein the adjusted pickup value is the minimum of the sum and the second pickup value.

20. The method of claim 19, wherein the second pickup value comprises 1.25.

21. The method of claim 18, wherein the differential element is further configured to calculate the function of the restraining current by scaling the restraining current with a high-security characteristic slope value.

22. The method of claim 18, wherein the step of filtering comprises filtering using a cosine filter.

23. The method of claim 18, wherein the step of summing the compensated current signals comprises summing magnitudes of the current signals.

\* \* \* \* \*